United States Patent [19]
Tanikawa et al.
[11] Patent Number: 4,550,480
[45] Date of Patent: Nov. 5, 1985

[54] METHOD OF PRODUCING SCROLL TYPE COMPRESSOR

[75] Inventors: Minoru Tanikawa, Shimizu; Yutaka Imaizumi, Yaizu; Masami Suzuki, Shizuoka; Kazumi Aiba, Shimizu; Minoru Sato, Shimizu; Mineo Takahashi, Shimizu, all of Japan

[73] Assignee: Hitachi, Ltd., Tokyo, Japan

[21] Appl. No.: 497,868

[22] Filed: May 25, 1983

[30] Foreign Application Priority Data

May 31, 1982 [JP] Japan .............................. 57-91235

[51] Int. Cl.[4] .............................................. B23P 15/00

[52] U.S. Cl. ........................ 29/156.4 R; 29/156.8 R; 29/DIG. 4; 29/DIG. 26; 228/135; 228/170; 228/174; 228/182; 418/55

[58] Field of Search .................. 29/156.4 R, 156.8 R, 29/156.8 B, 156.8 CF, 156.8 FC, DIG. 4, DIG. 26; 418/55; 228/135, 170, 174, 182; 219/85 R

[56] References Cited

U.S. PATENT DOCUMENTS

| | | | |
|---|---|---|---|
| 1,973,591 | 9/1934 | Weber | 228/174 X |
| 2,336,791 | 12/1943 | La Barre | 219/93 X |
| 2,385,991 | 10/1945 | Huntoon | 219/93 X |
| 2,940,169 | 6/1960 | Barnes | 228/182 |
| 3,884,599 | 5/1975 | Young et al. | 418/55 |
| 3,994,635 | 11/1976 | McCullough | 418/55 |
| 4,180,244 | 12/1979 | Rosenitsch | 29/412 X |
| 4,365,736 | 12/1982 | Stumm | 228/135 X |
| 4,436,495 | 3/1984 | McCullough | 418/55 |

FOREIGN PATENT DOCUMENTS

| | | | |
|---|---|---|---|
| 57686 | 4/1980 | Japan . | |
| 57687 | 4/1980 | Japan . | |
| 69772 | 5/1980 | Japan | 418/55 |
| 160194 | 12/1980 | Japan | 418/55 |
| 2487 | 1/1981 | Japan | 418/55 |

*Primary Examiner*—Howard N. Goldberg
*Assistant Examiner*—Ronald S. Wallace
*Attorney, Agent, or Firm*—Antonelli, Terry & Wands

[57] ABSTRACT

An improved method of producing a scroll type compressor having an orbital scroll member and a stationary scroll member. The orbital scroll member is fabricated by a process comprising the steps of: forming an end plate and a spiral wrap separately, the end plate being composed of an upper half part having a discontinuous joining portion for joining the spiral wrap and a lower half part having an oil passage. The upper half part and the lower half part of the end plate are fixed to each other through mutual engagement between locating projections formed by a plastic work on one of the half parts and mating holes formed in the other of the half parts. The stationary scroll member is produced by a process similar to the process used in fabricating the orbital scroll, comprising the steps of: forming an end plate and a spiral wrap separately, the end plate being punched from a sheet blank; forming a discontinuous joining portion on one side of the end plate; joining the spiral wrap to the end plate at the discontinuous joining portion; joining the end plate to one end of a sleeve; and joining a flange to the other end of the sleeve. The discontinuous joining portion may be constituted by a plurality of projections formed to project from the surface of the end plate, or may include a plurality of grooves or recesses formed in the surface of the end plate and projections formed on the end surface of the wrap at positions corresponding to the grooves or recesses.

3 Claims, 16 Drawing Figures

METHOD OF PRODUCING SCROLL TYPE COMPRESSOR

BACKGROUND OF THE INVENTION

The present invention relates to a method of producing a scroll type compressor and, more particularly to a method of producing the scroll members incorporated in such a compressor.

The scroll type compressor is a machine incorporating a stationary scroll member and an orbital scroll member which are assembled together to define working fluid chambers therebetween. In operation, the orbital scroll member is driven by a suitable driving means to make an orbital movement with respect to the stationary scroll member so that the volume of the working fluid chambers is progressively changed to compress and discharge the fluid. A typical example of this type of compressor is shown in, for example, U.S. Pat. No. 3,884,599. In general, each of the stationary and orbital scroll members has as its essential parts and end plate and a spiral wrap protruding from one side of the end plate. More specifically, the stationary scroll member for instance has a spiral wrap, end plate and a boss which are formed integrally. A plurality of oil ports are formed in the end plate to open in the flat surface of the latter. These oil ports are in communication with oil passages formed in the end plate to provide passages for the lubricating oil. These oil ports are usually formed by machining from the outer peripheral surface of the end plate for the convenience's sake in the machining. After the machining, suitable plugging members are fitted into the machining ends of the oil ports to close the latter. The scroll type compressor has a bearing portion to which fitted is a bearing metal receiving the crank portion of the drive shaft. A slight space is left in the upper end portion of the bearing. This space is in communication with the aforementioned oil ports. Therefore, the lubricating oil supplied for lubrication of the bearing metal is supplied to the surface of the end plate through the space in the upper end portion of the bearing portion and then through the oil ports.

The above-described stationary scroll member can be formed, for example, by a machining from an integral cast blank. The cast blank, however, generally suffers from inferior dimensional precision so that a long time is required for the machining of the wrap and fine oil ports thereby impractically lowering the efficiency of the work impractically.

U.S. Pat. No. 3,994,635 discloses a method of producing a scroll member, improved to overcome the problems in the conventional production method relying upon machining. According to this method, the spiral wrap is formed as a body separate from the end plate and a fitted in a spiral groove formed beforehand in the surface of the scroll member. The wrap and the end plate are then united with each other by means of, for example, screws. This method, however, is still time consuming due to the necessity for the machining of the spiral groove and oil ports.

Thus, these conventional methods undesirably require long processing time and high production cost. Although other methods such as precision casting, precision forging and so forth are proposed, these methods are still unsatisfactory in that they necessitate the use of special process for attaining the required precision or an additional step of surface treatment.

Accordingly, an object of the invention is to provide a method of producing an improved scroll member of the type in which the end plate and the wrap are formed separately and then assembled together thereby permitting an easy assembling of the wrap and the end plate, as well as high productivity and precision of the scroll member.

In order to overcome the above-described problems of the prior art, methods in which the end plate and the wrap of a scroll member are formed separately and then fixed to each other by making use of a plastic work technique have already proposed by the assignee of the present invention. These methods are disclosed, for example, in Japanese Patent Application Nos. 128358/1978, 76909/1979 and 128584/1978. In these proposed methods, a groove for receiving the wrap is formed in the surface of the end plate by plastic working, and a wrap formed separately from the end plate is fitted in the groove and fixed at its entire periphery by brazing, adhesion, welding such as resistance welding and laser beam welding, diffusion bonding or caluking.

According to the invention, there is provided a method of producing a scroll member in which the end plate and the siral wrap are formed separately, and a discontinuous joining portion is formed either on the end plate or on the lower end of the spiral wrap, so that the end plate and the wrap are joined to each other at the discontinuous joining portion. The joint is achieved preferably by resistance welding. When the orbital scroll member is produced by means of resistance welding, it is preferred to divide the end plate in thickness direction into two parts, namely, an upper half part which is to be joined to the wrap and a lower half part which is to be connected to the boss. The upper half part of the end plate is provided with discontinuous protrusion which easily produces heat during the resistance welding. The discontinuous protrusion is formed preferably by plastic working. On the other hand, the lower half part of the end plate is provided with oil grooves which are formed also preferably by plastic working. The upper and lower half parts of the end plate are then fixed to each other through mutual engagement between locating projections and mating holes formed preferably by a plastic work in their surfaces.

In the production of the stationary scroll member, the end plate and the wrap are formed separately from each other as in the case of the orbital scroll member. In this case, however, the end plate is an integral member from the beginning and is punched out from a sheet blank. The peripheral portion of the sheet blank after the punching out of the end plate constitutes a flange portion of the stationary scroll member which contacts with the end plate of the orbital scroll member.

BRIEF DESCRIPTION OF THE DRAWINGS

The invention will be fully described hereinunder through its preferred form illustrated in the atached drawings.

DETAILED DESCRIPTION

Figure 1A:
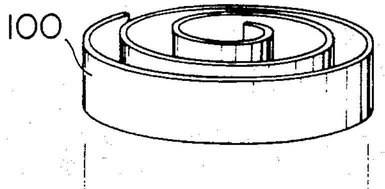
FIG. 1*a* is a perspective view of a wrap of an orbital scroll member.
Figure 1B:
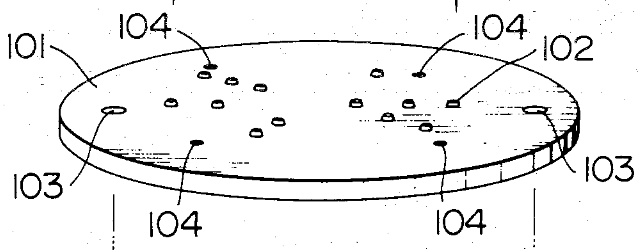
FIG. 1*b* is a perspective view of an upper half part of an end plate of an orbital scroll member processed in accordance with the method of the invention.
Figure 1C:
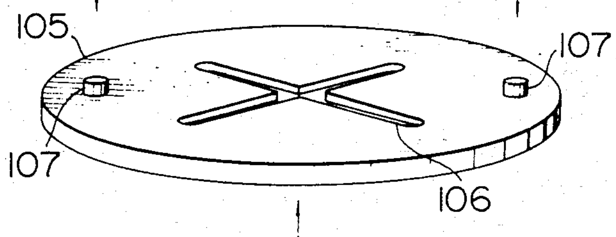
FIG. 1*c* is a perspective view of a lower half part of the end plate of an orbital scroll member processed in accordance with the method of the invention.
Figure 1D:
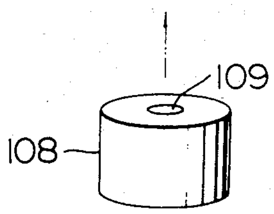
FIG. 1*d* is a perspective view of a bearing boss of an orbital scroll member processed in accordance with the method of the invention.

According to the invention, the orbital scroll member and the stationary scroll member of a scroll type compressor are respectively divided into several parts. Referring now to the drawings wherein like reference numerals are used throughout the various views to designate like parts and, more particularly, to FIGS. 1*a*–1*d*, according to these figures, an orbital scroll member includes a wrap 100 formed by cutting a strip of a length and breadth matching those of the spiral wrap, out of a web material, and then bending the cut out strip into the form of the spiral wrap 100. An upper half part 101 of an end plate is provided with a plurality of projections 102 formed by plastic working to protrude upwardly therefrom and constitute a discontinuous protrusion extending spirally substantially in conformity with the spiral form of the wrap 100. The upper half part 101 of the end plate is provided also with locating and joining through holes 103 for cooperating with locating projections on the lower half part of the end plate as will be explained later. The upper half part 101 of the end plate is further provided with through holes 104 constituting oil ports. The aforementioned lower half part 105 of the end plate has a cross-shaped channel constituting an oil passage 106 formed in the center thereof by a plastic work. The ends of limbs of the cross-shaped oil passage 106 have ends communicated with the oil ports 104. The lower half part 105 of the end plate is provided also with locating projections 107 formed also by plastic working and adapted to cooperate with the locating and joining holes 103 which are formed, as explained before, in the upper half part 101 of the end plate. A 108 bearing boss is provided with a bearing metal receiving bore 109.

Figure 2:
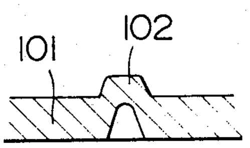
FIG. 2 is a sectional view of a protrusion formed by plastic working.
Figure 3:
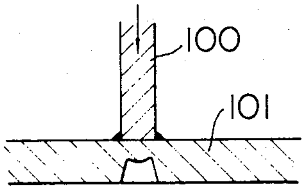
FIG. 3 is an illustration showing how the wrap is joined to the end plate.
Figure 4:
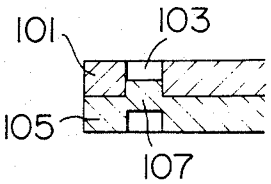
FIG. 4 is an illustration showing how an upper and lower half parts of the end plate are united with each other.
Figure 5A:
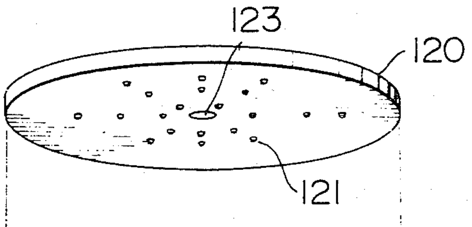
FIG. 5*a* is a perspective view of an end plate of a stationary scroll member.
Figure 5B:
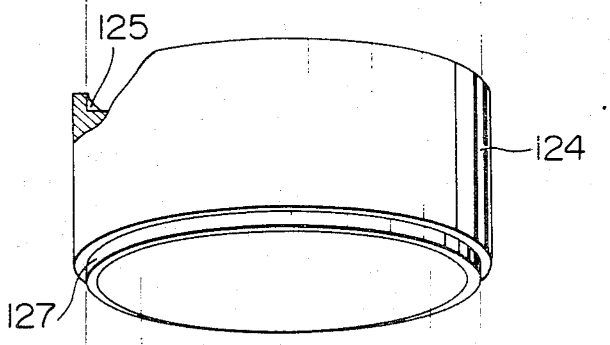
FIG. 5*b* is a perspective view of a sleeve of a stationary scroll member.
Figure 5C:
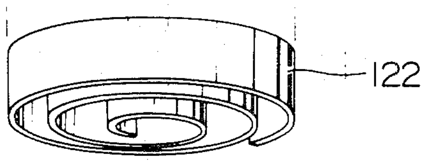
FIG. 5*c* is a perspective view of a wrap of a stationary scroll member.
Figure 5D:
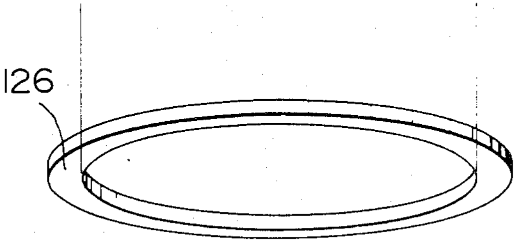
FIG. 5*d* is a perspective view of the flange portion of a stationary scroll member.

The projections 102 constituting the discontinuous protrusion are formed by plastic working in in the manner illustrated most clearly in FIG. 2. The parts explained in the first step of forming the orbital scroll member, the wrap 100 is located by a locating jig (not shown) on the plurality of projections 102 while confirming the positional precision. Then, a resistance welding is conducted to bring the end surface of the wrap into close contact with the end plate and to weld the contact surfaces in a discontinuous manner along the spiral line on which the projections are formed. Any gap which may be left in the discontinuity, i.e. the space between two adjacent projections 102, can simply be filled or closed, for example, by brazing. The upper half part 101 and the lower half part 105 of the end plate are united with each other with their holes 103 and projections 107 fitting each other. Then, the bearing boss 108 is joined to the lower side of the lower half part 105 of the end plate by resistance welding or friction welding to complete the orbital scroll. In the completed orbital scroll member, the bearing metal receiving bore 109 of the bearing boss 108 is held in communication with substantially central portion of the oil passage 106 formed in the lower half part 105 of the end plate, while the ends of the oil passage 106 lead to oil ports 104 in the upper end plate 101 as explained before.

With the stationary scroll member, as shown most clearly in FIGS. 5*a* to 5*d*, the stationary scroll member includes an end plate 120 provided with a plurality of projections 121 formed by plastic working to provide a discontinuous protrusion which extends along the spiral line conforming with the spiral configuration of the wrap 122. The end plate 120 is provided with a discharge port 123, and a sleeve 124 is provided, at its upper end, with a step 125 for receiving and fixing the peripheral end portion of the end plate 120 and, at its lower portion, with a step 127 for receiving and fixing a flange 126. The flange 126 is adapted to contact, at its lower side, the upper surface of the end plate 101 of the orbital scroll member. The flange 126 is produced from the sheet blank after the punching of the end plate 120 therefrom. In assembling the stationary scroll member, the wrap 122 is welded to the end plate 120 on and along the projections 121 formed on the end plate 120. The end plate 120, now integral with the wrap 122, is then fitted at its peripheral portion in the step 125 of the sleeve 124 and is joined to the latter by, for example, brazing. Subsequently, the flange 126 is fitted and fixed in the step 127 of the sleeve 124 by, for example, brazing.

Figure 6A:
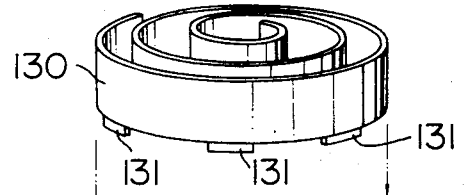
FIG. 6*a* is a perspective view of a wrap of an orbital scroll member constructed in accordance with another embodiment of the present invention.
Figure 6B:
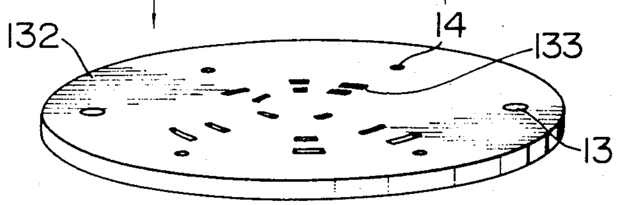
FIG. 6*b* is a perspective view of an upperhalf part of the end plate of an orbital scroll member.
Figure 6C:
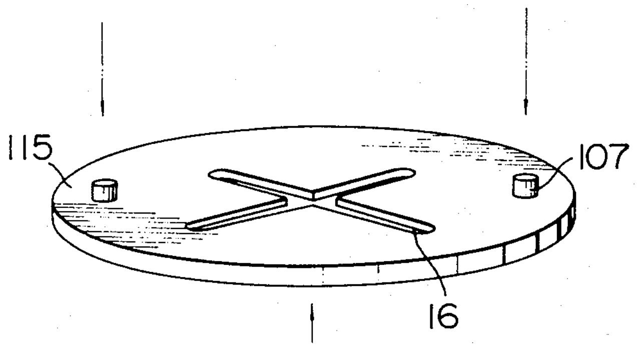
FIG. 6*c* is a perspective view of a lower end plate of an orbital scroll member.
Figure 6D:
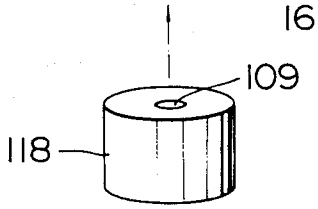
FIG. 6*d* is a perspective view of a bearing boss of the orbital scroll member.
Figure 7:
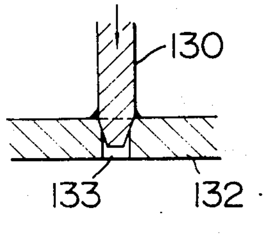
FIG. 7 is an illustration showing how the wrap and the upper end plate are joined to each other.

As shown in FIGS. 6*a* to 6*d* and FIG. 7 an orbitary scroll member may also be produced wherein a wrap 130 is provided on the lower surface thereof with a plurality of projections 131 formed along the spiral configuration thereof so as to constitute a discontinuous protrusion, with an upper half part 132 of the end plate being provided with a plurality of grooves or recesses 133 formed by a plastic work at positions corresponding to the positions of the projections 131 on the wrap 130. FIGS. 6*c* and 6*d* respectively show a lower half part of the end plate and a bearing boss which are same as those shown in FIGS. 1*c* and 1*d*. With the projections 131 fitted in the corresponding grooves or recesses 133, the wrap 130 is joined to the upper half part 132 of the end plate by resistance welding. Then, the lower half part 115 of the end plate, upper half part 132 of the end plate and the bearing boss 118 are integrated into one body by the same method as that explained before in connection with FIGS. 1*a*–1*d*. According to this method, it is possible to secure the wrap 130 and the upper end plate 132 to each other with a higher accuracy and reliability.

The method of the invention described hereinbefore offers the following advantages over the prior arts.

Namely, the thermal distortion of the wrap and the end plate is extremely diminished as compared with the conventional method in which the wrap is welded over its entire length. In addition, the joining of the wrap to the end plate, as well as the processing of the oil passage, can be achieved more easily than in the conventional methods. Thus, according to the invention, it is possible to produce scroll members of a scroll type compressor with a high accuracy and at a high productivity.

Although the invention has been described through specific terms, it is to be noted here that the described embodiments are not exclusive and various changes and modifications are imparted thereto without departing from the scope of the invention which is limited solely by the appended claims.

What is claimed is:

1. A method of producing an orbital scroll member of a scroll type compressor, with the compressor including the orbital scroll member and a stationary scroll member each having an end plate and a spiral wrap protruding upright from said end plate, said spiral wrap of the stationary scroll member being of substantially the same spiral shape as that of the spiral wrap of the orbital scroll member and being engaged by the spiral wrap of the orbital scroll member, the method comprising the steps of:

forming a spiral wrap for the orbital scroll member by cutting a strip of a length and breadth matching a desired spiral wrap and bending said strip in the spiral shape of the desired spiral wrap;

providing an upper half part of an end plate for the orbital scroll member;

forming by plastic working, on a surface of said upper half part, a plurality of projections constituting a discontinuous protrusion extending spirally substantially in conformity with the spiral form of the spiral wrap, forming a plurality of through holes for oil at portions of said upper half part which are to contact with a flange of the end plate for the stationary scroll member, and forming a plurality of locating holes through said upper half part near the outer periphery thereof;

placing said spiral wrap on said discontinuous protrusion of the upper half part and fixing said spiral wrap to said upper half part by resistance welding;

providing a lower half part of said end plate having the same external size as that of said upper half part;

forming by plastic working, in a surface of said lower half part adapted to contact with said upper half part, grooved oil passage means for permitting all of said oil holes of the upper half part to communicate with each other, and forming projections in a shape adapted to fit into said locating holes of the upper half part on said surface of said lower half part at positions corresponding to those of said locating holes;

securing uniting together said upper half part and said lower half part by fitting said projections of the lower half part into said locating holes of the upper half part;

providing a bearing boss formed with a bearing metal receiving bore adapted to communicate with said oil passage means of the lower half part; and fixing said bearing boss to said lower half part of the end plate by welding and fitting a bearing metal into said bearing metal receiving bore in such a manner that said bearing metal receiving bore is held in communication with said grooved oil passage means of the lower half part.

2. A method as claimed in claim 1, wherein the step of forming said grooved oil passage means includes forming the oil passage means substantially in a cross-shaped lying in said surface of the lower half part adapted to contact said upper half part so that a central portion of said cross-shaped oil passage means is adapted to communicate with said bearing metal receiving bore of said bearing boss and four tip portions of said cross-shaped oil passage means are adapted to communicate with the respective oil holes of the upper half part.

3. A method of producing a stationary scroll member of a scroll type compressor, the compressor including an orbital scroll member and the stationary scroll member each having an end plate and a spiral wrap protruding upright from said end plate, said spiral wrap of the stationary scroll member being of substantially the same spiral shape as that of the spiral wrap of the orbital scroll member and being engaged by the spiral wrap of the orbital scroll member, the method comprising the steps of:

forming a spiral wrap for the stationary scroll member by cutting a strip of a length and breadth matching those of a desired spiral wrap and bending said strip in the spiral shape of the desired spiral wrap;

forming an end plate for the stationary scroll member by punching a sheet blank, and forming a flange from the remaining sheet blank after the punching of said end plate;

forming by plastic working, on a surface of said end plate, a plurality of projections constituting a discontinuous protrusion extending spirally substantially in conformity with the spiral form of said spiral wrap;

placing said spiral wrap on said discontinuous protrusion of the end plate and fixing said spiral wrap to said end plate by resistance welding;

providing a sleeve for the stationary scroll member having a stepped portion formed in a bore thereof at one end of the sleeve for receiving said end plate and another stepped portion formed at an outer peripheray of said sleeve at the other end thereof for receiving said flange constituting a surface adapted to contact with the end plate of said orbital scroll member;

fixing said end plate to said sleeve by brazing with said end plate fitted into said stepped portion at one end of the sleeve; and fixing said flange to said sleeve by brazing said another stepped portion of the sleeve fitted into the punched bore of the flange.

* * * * *